US012045640B2

(12) United States Patent
Kumar et al.

(10) Patent No.: US 12,045,640 B2
(45) Date of Patent: Jul. 23, 2024

(54) SYSTEM, APPARATUS AND METHOD FOR ACCESSING MULTIPLE ADDRESS SPACES VIA A DATA MOVER

(71) Applicant: Intel Corporation, Santa Clara, CA (US)

(72) Inventors: Sanjay K. Kumar, Hillsboro, OR (US); Philip Lantz, Cornelius, OR (US); Rajesh Sankaran, Portland, OR (US); Narayan Ranganathan, Bangalore (IN); Saurabh Gayen, Portland, OR (US); David A. Koufaty, Portland, OR (US); Utkarsh Y. Kakaiya, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 745 days.

(21) Appl. No.: 16/909,084

(22) Filed: Jun. 23, 2020

(65) Prior Publication Data
US 2021/0342182 A1    Nov. 4, 2021

(30) Foreign Application Priority Data
Apr. 30, 2020  (IN) .............................. 202041018444

(51) Int. Cl.
*G06F 9/455*  (2018.01)
*G06F 9/34*  (2018.01)
(Continued)

(52) U.S. Cl.
CPC .......... *G06F 9/45558* (2013.01); *G06F 9/342* (2013.01); *G06F 9/4875* (2013.01);
(Continued)

(58) Field of Classification Search
CPC .... G06F 9/45558; G06F 9/342; G06F 9/4875; G06F 12/10; G06F 12/109;
(Continued)

(56) References Cited

U.S. PATENT DOCUMENTS 7,581,074 B2 * 8/2009 Greiner ............... G06F 9/30003
                                                    711/164
11,048,644 B1 * 6/2021 Volpe .................. G06F 12/1072
(Continued)

FOREIGN PATENT DOCUMENTS

WO    2018152688 A1   8/2018

OTHER PUBLICATIONS

Intel Corporation, "Intel® Data Streaming Accelerator Preliminary Architecture Specification," Nov. 2019, 125 pages.
(Continued)

*Primary Examiner* — Michael W Ayers
(74) *Attorney, Agent, or Firm* — Nicholson De Vos Webster & Elliott LLP

(57) ABSTRACT

In one embodiment, a data mover accelerator is to receive, from a first agent having a first address space and a first process address space identifier (PASID) to identify the first address space, a first job descriptor comprising a second PASID selector to specify a second PASID to identify a second address space. In response to the first job descriptor, the data mover accelerator is to securely access the first address space and the second address space. Other embodiments are described and claimed.

18 Claims, 9 Drawing Sheets

(51) Int. Cl.
*G06F 9/48* (2006.01)
*G06F 12/10* (2016.01)
*G06F 12/109* (2016.01)
*G06F 12/14* (2006.01)

(52) U.S. Cl.
CPC ............ *G06F 12/10* (2013.01); *G06F 12/109* (2013.01); *G06F 12/1441* (2013.01); *G06F 2009/45579* (2013.01); *G06F 2009/45583* (2013.01); *G06F 12/145* (2013.01); *G06F 12/1475* (2013.01); *G06F 12/1483* (2013.01); *G06F 2212/1016* (2013.01); *G06F 2212/152* (2013.01); *G06F 2212/656* (2013.01); *G06F 2212/657* (2013.01)

(58) Field of Classification Search
CPC ....... G06F 12/1441; G06F 2009/45579; G06F 2009/45583; G06F 2212/657; G06F 2212/1016; G06F 12/1483; G06F 12/1475; G06F 12/145; G06F 2212/152; G06F 2212/656
See application file for complete search history.

(56) References Cited

U.S. PATENT DOCUMENTS

| | | | | |
|---|---|---|---|---|
| 2014/0156934 | A1* | 6/2014 | Ohyama | G06F 3/0683 711/123 |
| 2017/0091125 | A1* | 3/2017 | Adachi | G06F 12/1027 |
| 2018/0088922 | A1* | 3/2018 | Cook | H04L 67/34 |
| 2018/0088978 | A1 | 3/2018 | Li | |
| 2018/0089099 | A1* | 3/2018 | Raj | G06F 12/10 |
| 2018/0253377 | A1 | 9/2018 | Liang et al. | |
| 2018/0278493 | A1* | 9/2018 | Guim Bernat | H04L 5/0055 |
| 2019/0108106 | A1 | 4/2019 | Aggarwal et al. | |
| 2019/0114195 | A1 | 4/2019 | Jani et al. | |
| 2019/0370050 | A1 | 12/2019 | Kumar et al. | |
| 2020/0012530 | A1 | 1/2020 | Kakaiya | |
| 2020/0117624 | A1 | 4/2020 | Kumar et al. | |
| 2021/0034547 | A1* | 2/2021 | Riley | G06F 12/1483 |

OTHER PUBLICATIONS

United States Patent Office, Non-Final Office Action dated Jun. 21, 2023 in U.S. Appl. No. 16/909,068 (42 pages).

United States Patent Office, Reply to Non-Final Office Action and Terminal Disclaimer Filed Sep. 15, 2023 in U.S. Appl. No. 16/909,068 (16 pages).

United States Patent Office, Final Office Action dated Dec. 21, 2023 in U.S. Appl. No. 16/909,068 (41 pages).

* cited by examiner

SYSTEM, APPARATUS AND METHOD FOR ACCESSING MULTIPLE ADDRESS SPACES VIA A DATA MOVER

This application claims priority to Indian Provisional Patent Application No. 202041018444, filed on Apr. 30, 2020, in the names of Sanjay Kumar; Philip Lantz; Rajesh Sankaran; Narayan Ranganathan; Saurabh Gayen; David Koufaty; and Utkarsh Y. Kakaiya, entitled "SYSTEM, APPARATUS AND METHOD FOR ACCESSING MULTIPLE ADDRESS SPACES VIA A DATA MOVER," the disclosure of which is hereby incorporated by reference.

TECHNICAL FIELD

Embodiments relate to data operations in a computing system.

BACKGROUND

A data mover is a device/accelerator that offloads memory copy and other related operations from a processor. For example, besides doing memory copy from source to destination, a data mover can also do a variety of other operations on memory. Data movers may support shared virtual memory (SVM), where they can access the same virtual address space as user space applications. However state of the art data mover devices support only a single address space per job descriptor, which limits use cases.

Many computing systems also provide support for scalable input/output virtualization (IOV) devices. These devices, which may include network interface circuits and memories among others, define assignable device interfaces (ADIs) that can be assigned to a virtual machine (VM) as part of a virtual device (VDEV) emulation. The ADIs are configured with a process address space identifier (PASID) to access the VM's memory directly. However using only a single PASID on the ADIs may cause high overhead in certain scalable IOV device usages.

DETAILED DESCRIPTION

Figure 1:
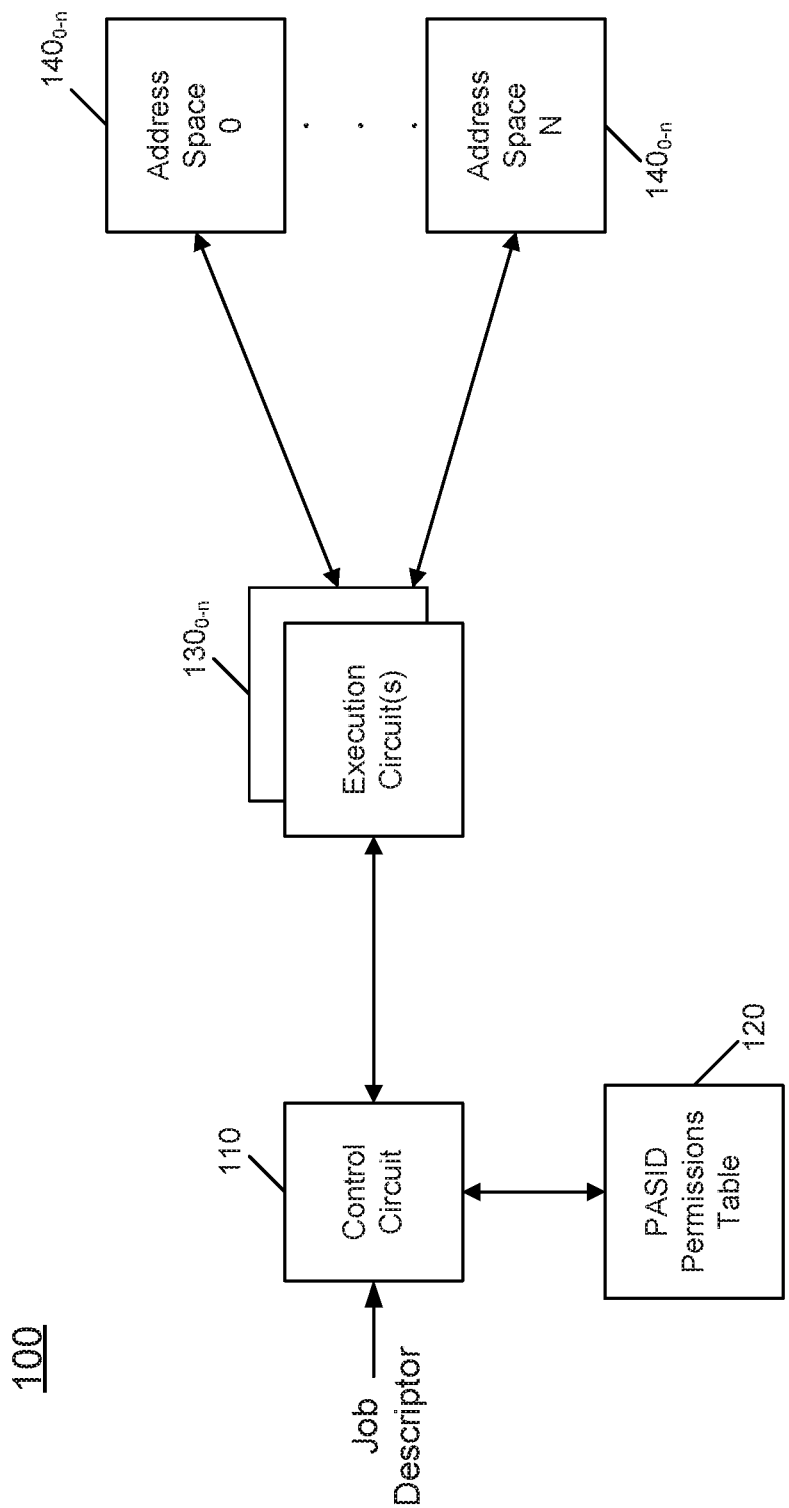
FIG. 1 is a block diagram of a data mover in accordance with an embodiment of the present invention.

In various embodiments, offload devices in various computing systems may be configured in a manner to enable such offload devices to perform data operations amongst multiple address spaces. With this arrangement, various memory-based tasks can be offloaded to these offload devices. Still further, such operations may be performed more efficiently by enabling a single device, in response to a single request, to access securely multiple address spaces (or at least portions thereof). As a result, various overheads in obtaining precursor data for such offload operations from different address spaces and collecting them into a single address space can be avoided. While embodiments herein are described in the context of data mover devices and virtualization devices such as input/output virtualization devices, understand that embodiments are not limited in this regard, and the techniques described herein can be used in a wide variety of computing environments.

In contrast, typical data movers operate on a job descriptor that is associated with a single process address space ID (PASID) corresponding to the application that submitted the descriptor. As part of descriptor processing, the data mover may access the submitter's memory (for source, destination, and completion addresses) using the PASID of the descriptor. However, using only a single address space for processing a descriptor limits various use cases where it is desired to access multiple address spaces. With embodiments herein, a process having a PASID (e.g., PASID X) may submit to a data mover a job descriptor having additional information to enable access to address spaces in addition to the process's own address space.

Although embodiments are not limited in this regard, various use cases may benefit from submitting a job descriptor having information for multiple PASIDs to enable a data mover to securely access multiple address spaces in response to this single job descriptor. One example is in the context of a virtual switch (vswitch) in a virtual machine monitor (VMM). This vswitch provides the functionality of switching packets between virtual machines (VMs) on the same system. As an example, the vswitch may be used to directly copy packets from a source VM's memory to a destination VM's memory. With embodiments, a job descriptor may provide information including addresses from three different address spaces, i.e., source address from source VM, destination address from destination VM, and completion address (to notify of completion) from vswitch application in the VMM. And as such, a data mover may, in response to this job descriptor, perform this memory operation to directly copy the packets, securely accessing three different address spaces.

As another example, in a multi-key total memory encryption (MKTME) usage where a different key is used to encrypt each VM's memory and the key ID is stored in cachelines of a central processing unit (CPU), a VMM may seek to flush CPU caches when it switches a VM on a CPU. With an embodiment, the VMM may offload this CPU cache flush for all of the VM's memory to the data mover by providing a job descriptor having addresses from two different address spaces, i.e., cache flush address range from the VM and completion address from the VMM. A still further example is in the context of shared memory usage. Assume here that two processes (e.g., message passing interface (MPI) ranks) may setup a shared memory and send/receive data through the shared memory pages. These processes may use a data mover for copying data between the two address spaces, via a job descriptor that includes addresses from two different address spaces (corresponding to the two applications).

Of course, a data mover may be configured to perform a variety of additional memory operations, in addition to copy or move operations. As examples, a data mover may also be configured to perform memory fill, copy with cyclic redundancy check (CRC), memory compare, dualcast, generating memory diffs between two memory regions, applying diffs to a memory region, flush CPU caches, etc.

In addition, embodiments enable a data mover to control access to a limited address range within address spaces. With embodiments, a data mover may control access to an address space on a more fine-grained manner for better isolation. For example, for some of the above usage cases, a data mover may control access to limited address ranges within an address space.

With embodiments, a data mover may be configured to securely access multiple address spaces in response to a single job descriptor that specifies multiple PASIDs. To verify an access requested by a first agent to an address space of a second agent is permitted, the data mover may include or be coupled to a PASID permissions table (PPT). This permissions table may be used to validate a job submitter's access permissions for accessing the other PASIDs, as well as limiting access to certain address ranges. The data mover may be configured by writing to the PASID permissions table directly by the privileged data mover driver software. In addition, the data mover may be configured, in response to a setup descriptor, to allow an unprivileged client to directly setup and modify its own address ranges and access permissions in the PASID permissions table.

In this way, a data mover can access memory from multiple address spaces to process individual jobs. As a result, clients and system software can avoid: 1) copying data into a single address space; or 2) mapping data into a single address space. Embodiments thus may reduce the overhead of data mover operations and enable offload from the CPU for one or more usage cases.

Referring now to FIG. 1, shown is a block diagram of a data mover in accordance with an embodiment of the present invention. As shown in FIG. 1, data mover 100 may be a hardware accelerator configured to perform data movement operations offloaded from a CPU or other requester. As such, data mover 100 may be implemented as a hardware circuit included in a processor such as system on chip (SoC), e.g., implemented on the same semiconductor die or within a common package or socket with the SoC. In yet other cases, data mover 100 may be implemented as a standalone device such as may be implemented within a datacenter system. In many implementations, data mover 100 may appear to the CPU or other requester as a peripheral device, e.g., a Peripheral Component Interconnect Express (PCIe) device.

In any event, as shown in the high level of FIG. 1, data mover 100 includes a control circuit 110 configured to receive incoming job descriptors from one or more requesters. While described herein as receiving offload requests from a CPU or other agent, understand that more typically these requests may be initiated in response to a memory operation requested by a software agent such as a given application, virtual machine, container, virtual machine monitor or other such software agent. Such requests may thereafter be offloaded from CPU to data mover 100.

In embodiments herein this job descriptor may include information to enable data mover 100 to access multiple address spaces. To this end, to verify that a requester is permitted to access additional address spaces, certain information included in the job descriptor may be used to access a PASID permissions table 120. As will be described herein, permissions table 120 may include multiple entries each to store information regarding permitted accesses to a given address space (referred to herein as an access address space) by a particular requester (also referred to herein as a submitter).

Assuming permission is verified, control circuit 110 may send information associated with a requested memory operation to one of multiple execution circuits $130_0$-$130_n$. Execution circuits 130 may be pipeline circuits that execute the requested operation such as a cyclic redundancy checksum (CRC). As will be described herein, each execution circuit 130 may be configured to issue memory operations to one of multiple address spaces $140_0$-$140_n$ using their respective PASID. Understand that in typical situations any one of execution circuits 130 may issue memory operations to any one of address spaces 140. As used herein, the term "address space" is used to refer to virtual address ranges accessible by a particular agent, such as a software agent. In different embodiments, supervisor software such as an operating system, virtual machine monitor, hypervisor or so forth may allocate different portions of a physical memory to different applications or other entities by creating a virtual address to physical address mapping in their address spaces. In addition, hardware circuitry of the processor, including a memory management unit, can be configured to provide address space protection such that only authorized agents are allowed to access a given address space. Understand while shown at this high level in the embodiment of FIG. 1, a data mover may include many other components and may be configured differently in other embodiments.

To enable a data mover's client to specify multiple address spaces in the job descriptor, the job descriptor may include additional fields for one or more PASID selectors for addresses specified in the descriptor. These PASID selectors specify additional PASIDs, called access PASIDs, that are to be accessed. Understand that these access PASIDs are in addition to a submitter PASID included in the job descriptor, which identifies the submitter's address space (i.e., submitter PASID). When the data mover receives a job descriptor having one or more PASID selectors, it accesses, via indexing using the PASID selector, the PASID permissions table entry to identify the access PASIDs and the submitter's permissions for the access PASIDs.

Figure 2:
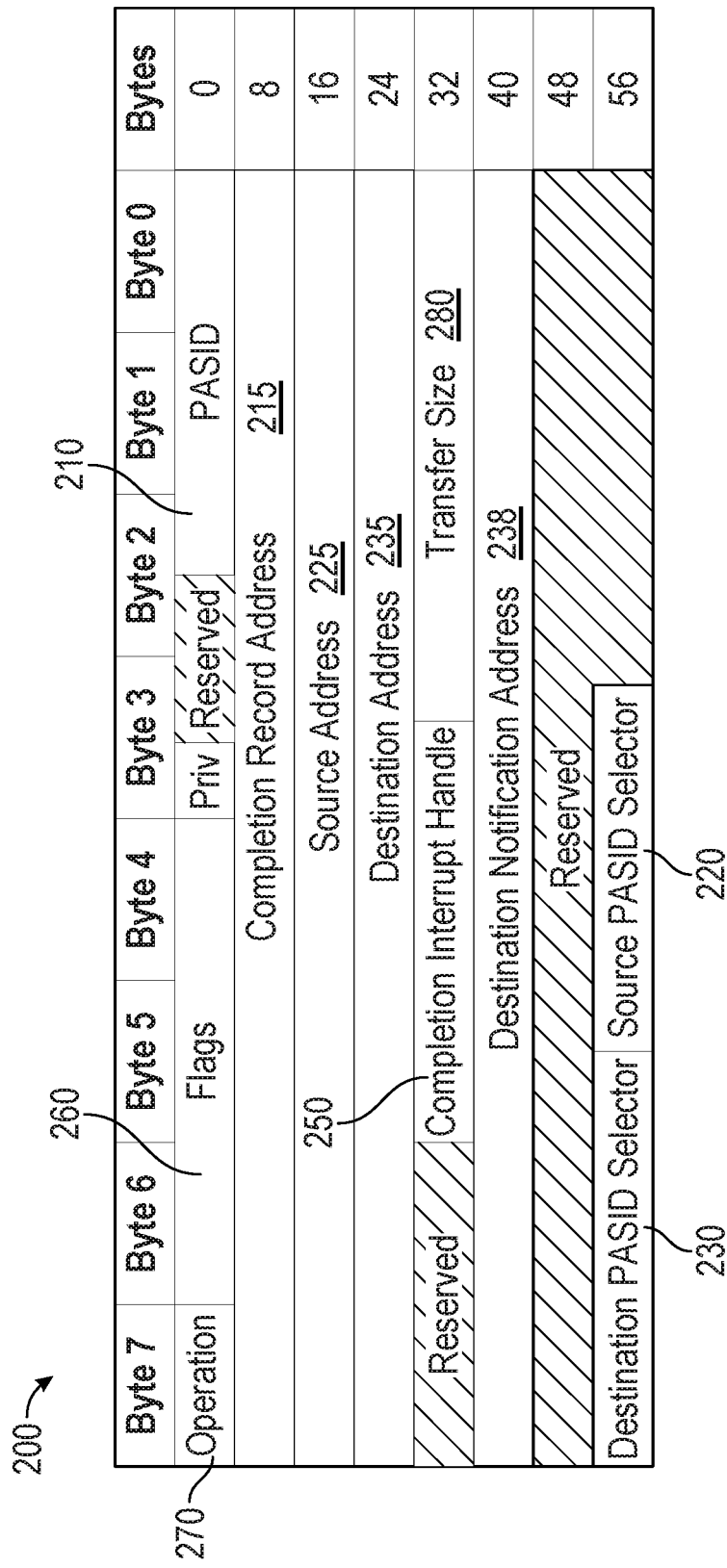
FIG. 2 is a block diagram of a memory move job descriptor in accordance with an embodiment.

Referring now to FIG. 2, shown is a block diagram of a memory move job descriptor in accordance with an embodiment. In the embodiment of FIG. 2, job descriptor 200 may be an example job descriptor for performing a memory move operation in which data stored at a source location is copied to a destination location. With embodiments herein, job descriptor 200 enables this memory move operation to occur across multiple address spaces, thus reducing overhead of the operation. As shown, job descriptor 200 is a data structure including various fields. Of interest herein, a submitter PASID field 210 is used to identify a submitter of job descriptor 200. Although the submitter PASID is part of the descriptor initialized by an unprivileged entity (e.g., application), the submitter PASID field cannot be initialized by unprivileged software. Submitter PASID field 210 is initialized by a CPU when sending the descriptor to the data mover or by a privileged entity (e.g., host device driver for the data mover) so the data mover always treats it as a trusted field. As shown, a completion record address field 215 may be used to identify an address within the address space of this submitter to which a completion record is to be written, upon completion of the memory move operation.

With embodiments herein, job descriptor 200 enables access to additional address spaces. More particularly here, in a first PASID selector field 220, a source PASID selector may be provided to indicate a source access address space from which source data for the memory move operation may be obtained. Thus a source address field 225 may be used to identify a source address within this source address space from which data to be moved may be accessed. Similarly, in a second PASID selector field 230, a destination PASID selector may be provided to indicate a destination access address space to which the source data is to be stored. Thus a destination address field 235 may be used to identify a destination address within this destination address space to which the data is to be copied. As further shown a destination notification address field 238 may be used to indicate where in the destination address space a notification regarding the completion can be written.

In the embodiment shown, note that job descriptor 200 may include other fields, including a completion interrupt handle field 250 to indicate where completion interrupt processing may occur. In some cases an additional PASID selector may identify an address space to which this field refers. Understand that additional fields, including a flags field 260 to store various flags, an operation field 270 to store an opcode (of the particular data move operation), among others also may be present. A transfer size field 280 may store size information for the move operation.

Additionally, while in the embodiment of FIG. 2, two PASID selector fields are shown, it is possible for a job descriptor to include more than two PASID selector fields, such as an additional PASID selector field for purposes of interrupt handling, and one or more other PASID selector fields for other purposes such as reporting completions, errors, telemetry information or job notifications. Understand while this particular job descriptor is shown in FIG. 2, similar PASID selector fields may be included in other types of job descriptors as well.

Thus job descriptor 200 includes additional fields to support a copy across two different address spaces, and which may be submitted by a third application. As discussed above, the PASID permissions table (PPT) translates a PASID selector in a job descriptor to an access PASID and its access permissions. The PASID selector is used as an index into the PPT. In an embodiment, the PPT may include a plurality of entries, each containing the submitter PASID and the access PASID to be used for accessing the memory. The submitter PASID field in the PPT entry is validated against the job submitter's PASID. The PPT entry also contains the access permissions (e.g., read, write, and drain) allowed for the submitter. Each PPT entry also contains one or more address ranges in the access PASID's address space that the submitter is allowed to access. Each PPT entry may either enable or disable the address range check. If address range check is disabled, the entire address space of access PASID is accessible by the submitter. Each PPT entry may also optionally disable the submitter PASID check, if the owner desires to open an address window for global access by any submitter PASID.

In one embodiment, the PASID permissions table is located on the data mover device (in SRAM or on-device memory). In another embodiment, the PASID permissions table is located in system memory and is pointed to by device memory mapped input output (MMIO) registers (base PPT address and size). If implemented in memory, the data mover may cache frequently accessed PPT entries on the device in a caching structure to improve performance. The PPT may be implemented as single level table or multi-level table, in different implementations. One implementation of a multi-level table may be such that the first level holds information on the access PASID and submitter PASID pairs, and the set of next level tables hold information about different address windows and their corresponding permissions. An implementation may also allow the second level tables to be directly mapped into the address space of the owner PASID to allow direct modification of the address window and permissions parameters.

Figure 3:
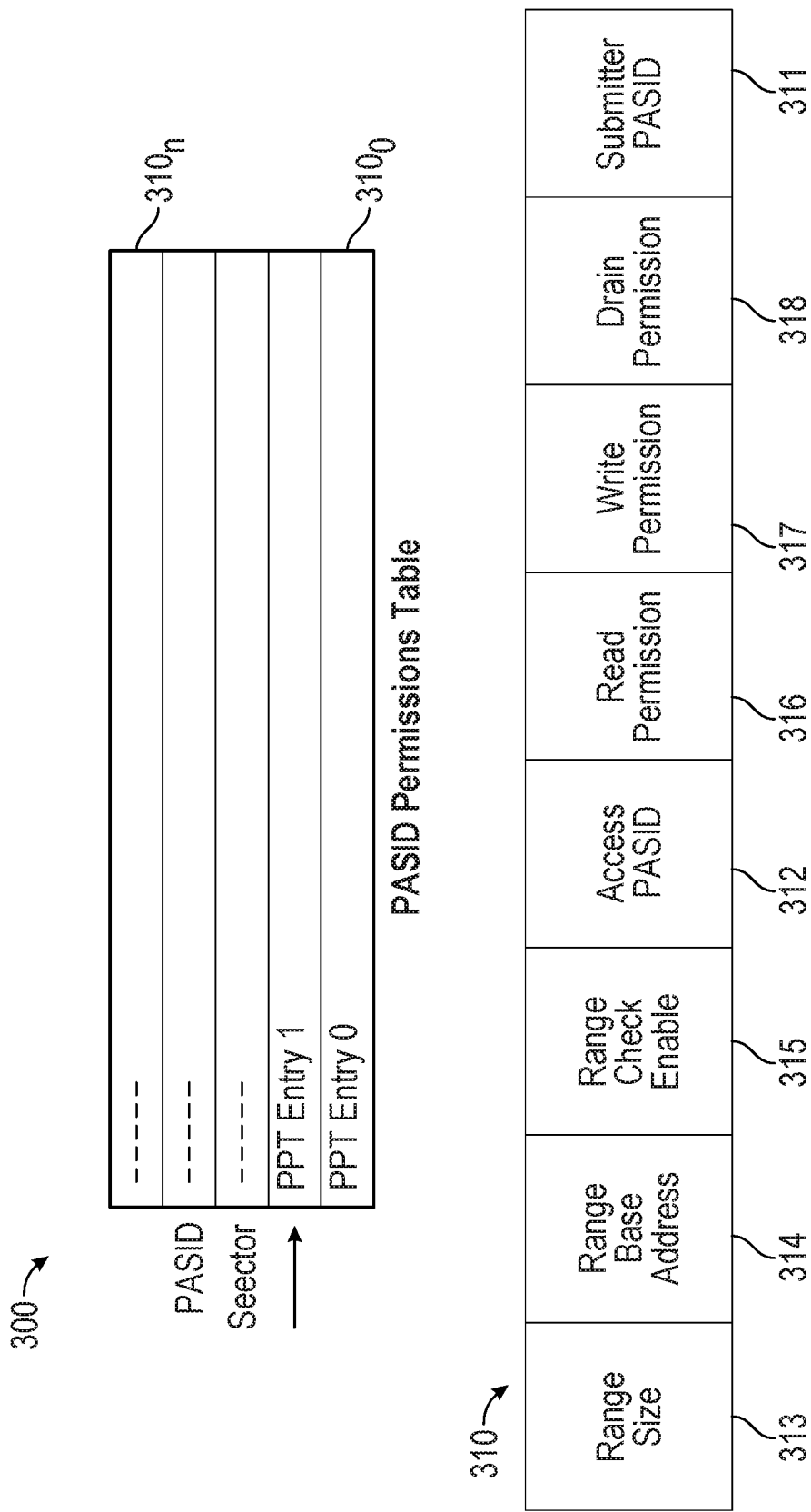
FIG. 3 is a block diagram of a PASID permissions table according to one embodiment.

Referring now to FIG. 3, shown is a block diagram of a PASID permissions table according to one embodiment. As shown in FIG. 3, only one address range is implemented per PPT entry. Besides read and write access permissions, the PPT entry also specifies whether the Submitter is allowed to perform a drain operation on the access PASID, which allows software to ensure that all jobs which access the specified PASID have been completed in the device.

As shown in FIG. 3, PASID permissions table 300 includes a plurality of entries $310_0$-$310_n$. As shown, an incoming PASID selector may be used to index into table 300 to access a given entry 310. FIG. 3 further shows details of a representative entry within PASID permissions table 300 in accordance with an embodiment. As illustrated, example entry 310 includes various fields, including a submitter PASID field 311 to store a submitter PASID, which identifies a submitter of a given request (e.g., by way of work or job descriptor), and an access PASID field 312 to store an access PASID for another address space to be accessed. In addition to these fields, example entry 310 further includes a range size field 313 to indicate an address range, when address range permissions are implemented. Further in this regard, a range base address 314 identifies a base address of an address range, and range check enable 315, which when set, indicates that address range permissions are enabled. As further shown, example entry 310 also includes additional permission fields, including a read permission field 316, a write permission field 317 and a drain permission field 318. Understand while shown with this particular implementation in the embodiment of FIG. 3, many variations and alternatives are possible.

The PASID permissions table can be setup by a privileged resource (e.g., a host driver for the data mover). To this end, applications may request the host driver to setup address ranges and access permissions. This may cause some amount of overhead if applications frequently want to change address ranges and/or access permissions for those address ranges. For example, two MPI applications may want to share different address ranges with each other for short periods of time and this requires frequent changes to the PPT entry.

To reduce this overhead, embodiments may allow applications to directly change PPT entry information (e.g., address ranges and access permissions) without going through the privileged host driver. To this end, an application may send a job descriptor called a PPT setup descriptor for updating PPT entries. The PPT setup descriptor contains the PASID selector corresponding to the PPT entry to be modified. The PPT entry's access PASID field is validated against the descriptor Submitter's PASID before updating the PPT entry. In one embodiment, an application is allowed to change the following fields in the PPT entry through this descriptor; Range Size, Range Base Address, Range Check Enable, Read Permission, Write Permission, and Drain Permission. Note that the PPT setup descriptor is a special case where the descriptor submitter's PASID is validated against the access PASID field rather than the submitter PASID field. The PPT setup descriptor can only modify an existing valid PPT entry. It cannot allocate and setup a new PPT entry.

In some embodiments, before the PPT entry can be updated, the access PASID is drained to ensure previously submitted descriptors use the old PPT entry values. In one embodiment, it is software's responsibility to ensure that the access PASID is drained from the device. In another embodiment, it is the data mover's responsibility to ensure the access PASID is drained from the device as part of processing the PPT setup descriptor. In an implementation where the data mover caches frequently accessed PPT entries in a cache, it may also evict an entry from the cache before, during or after processing the PPT setup descriptor.

The data mover may handle incoming requests for multi-PASID secure access differently dependent on whether a peer application wants to access another peer application's address space, or whether a privileged resource (e.g., OS or VMM) wants to access its deprivileged application or VM's address space respectively.

When a VMM wants to access a VM's address space through the data mover, it requests the host driver to setup a PASID permissions table entry. The host driver allocates a PPT entry, sets it up and returns the corresponding PASID selector to the VMM. The VMM may setup the PPT entry to access the entire VM's address space (i.e., guest physical address (GPA) space) or part of the address space through an address range check in the PPT entry. Alternately, the VMM may allow the VM to implicitly or explicitly set the address range in the PPT entry to limit the VMM's access to VM's address space through the data mover. Such operation may be used for vswitch and MKTME usages described above.

After this setup, the VMM can submit job descriptors to the data mover with the corresponding PASID selector. The data mover validates the submitter's access permissions for the access PASID and then accesses the VM's memory using the access PASID in the PPT entry.

For the case of an application accessing a peer application's address space, operation may proceed as follows. Assume Application A wants to share its address space with Application B. Application A first requests the data mover (e.g., via its host driver) to allow Application B access to its address space. Application A may initially provide an address range or the whole address space. The host driver allocates a PPT entry, sets it up, and returns the corresponding PASID selector (PPT entry index) to Application A. Application A then sends the PASID selector to Application B. This communication, in an embodiment, may be via an out-of-band mechanism (e.g., through inter-process communication). Application B may then use the PASID selector in job descriptors that it sends to the data mover.

If Application A seeks to change the sharing (either disable sharing or change the address range), it notifies Application B of the impending change. After receiving acknowledgement from Application B, Application A submits a PPT setup descriptor to the data mover to change the PPT entry. If address ranges were changed, after completion of the PPT setup descriptor, Application A communicates to Application B the new address ranges, to allow Application B to access those address ranges.

Figure 4:
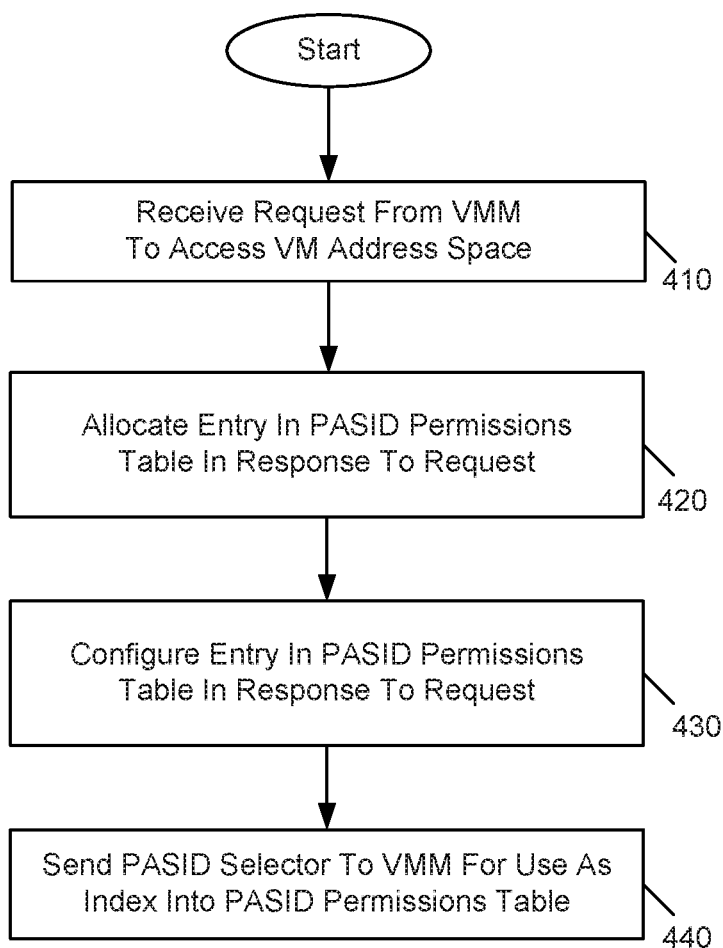
FIG. 4 is a flow diagram of a method in accordance with one embodiment.

Referring now to FIG. 4, shown is a flow diagram of a method in accordance with one embodiment. More specifically, method 400 of FIG. 4 is a method for setting up a privileged entity to access an address space associated with an unprivileged entity. As such, method 400 may be performed by a host driver, e.g., a privileged driver software that executes within a host OS. Accordingly, method 400 may be performed by hardware circuitry, firmware, software and/or combinations thereof.

As shown in FIG. 4, method 400 may be used to enable a VMM to access an address space of a VM that executes under the VMM. Of course many other examples of setting up address space permissions are possible, including allowing a privileged resource to access an address space associated with another privileged resource, a different type of unprivileged resource or so forth. Still further it is possible that unprivileged resources may seek to access address spaces associated with other unprivileged resources.

In FIG. 4, method 400 begins by receiving a request from a VMM (block 410). More specifically, at block 410 this request received in the data mover driver may be for seeking access to an address space associated with a VM such as a guest application that executes under the VMM. In one embodiment, this request may be implemented as a setup request. As seen, in response to this request, at block 420 the data mover driver may allocate an entry in the PASID permissions table. Note that if no available entries are present, the request may be denied.

Next at block 430 this entry may be configured. More specifically, various information from the received request, e.g., setup request, may be stored in this entry. As an example, in response to the setup request, the data mover driver may initialize the first entry in the PASID permissions table to store a submitter PASID for the VMM to enable the VMM's secure access to the second address space, along with a PASID selector for the address space of the VM. In addition, various permissions to be granted to this submitter for the address space of the access PASID may be filled out. As examples, these permissions may include read and write access and drain access, among others. Of course other access permissions are possible in other embodiments. Then at block 440 a PASID selector is returned to the VMM. More specifically, this PASID selector may be used by the VMM to act as an index into the PASID permissions table when the VMM later issues a job descriptor to perform a memory operation, offloaded to the data mover, for the VMM as requester. Understand while shown at this high level in the embodiment of FIG. 4, many variations and alternatives are possible.

Figure 5:
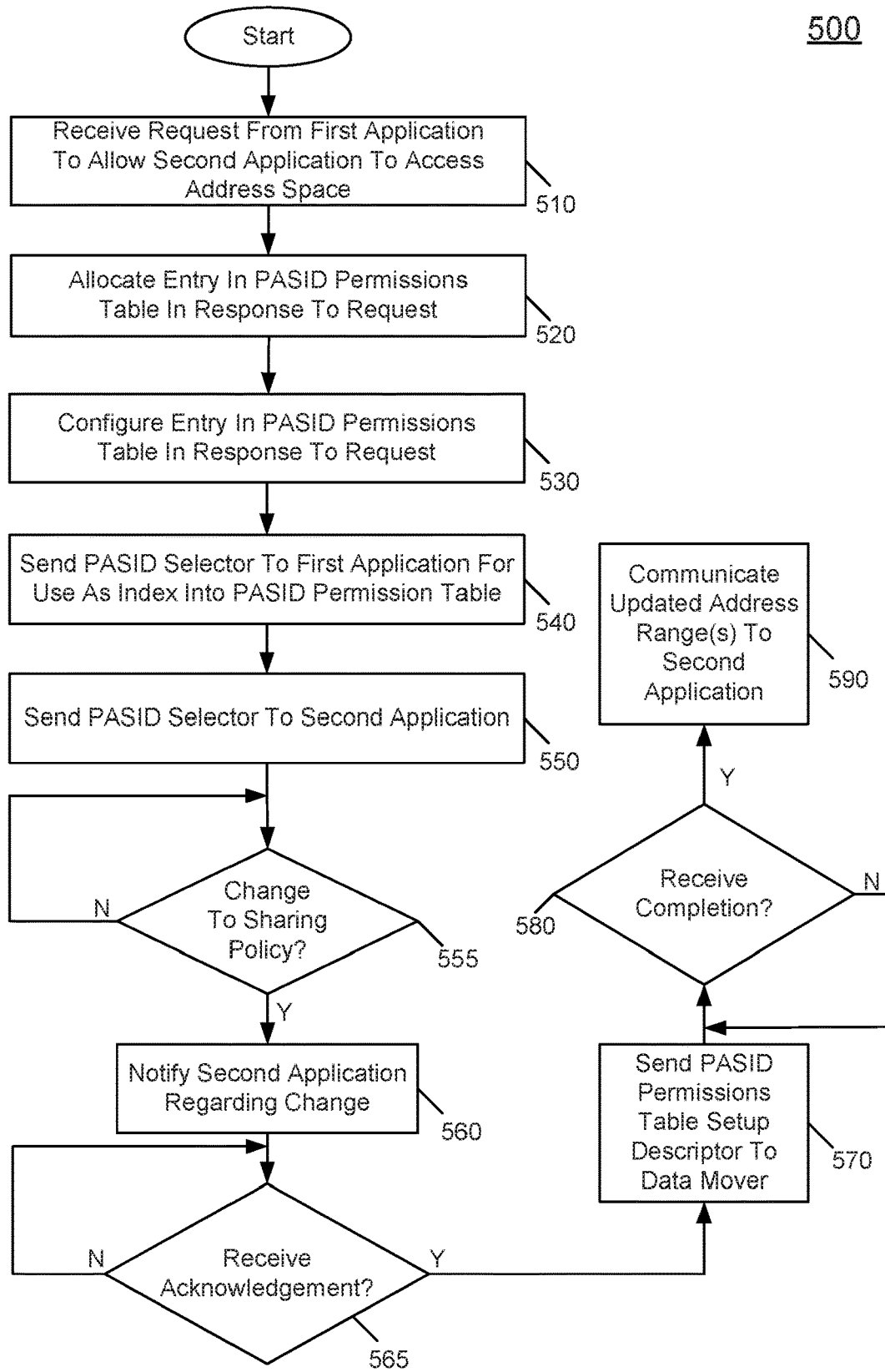
FIG. 5 is a flow diagram of a method in accordance with another embodiment.

Referring now to FIG. 5, shown is a flow diagram of a method in accordance with another embodiment. More specifically, method 500 of FIG. 5 is a method for setting up a unprivileged entity accesses, and updates to the same. As such, method 500 may be performed by a host driver and multiple, e.g., unprivileged applications. Accordingly, method 500 may be performed by hardware circuitry, firmware, software and/or combinations thereof.

In FIG. 5, method 500 begins by receiving a request from a first application to allow another application to access its address space, e.g., via a setup descriptor from a VMM (block 510). In response to this request, at block 520 the data mover driver may allocate an entry in the PASID permissions table. Next at block 530 this entry may be configured. Then at block 540 a PASID selector is returned to the first application.

Next, at block 550 this PASID selector is sent to the application. In embodiments herein, the first application may send this PASID selector to the second application via an out-of-band mechanism, such as via an MPI interface. Thus at this point, with this provision of the PASID selector, the second application may issue a request to a data mover that seeks to access at least part of an address space associated with the first application.

In some cases, it is possible that the application may seek to change the permission and/or address range of the shared region at some point. Accordingly, with further reference to FIG. 5, it may be determined at diamond 555 whether there is a change to a sharing policy. For example, a change in access permissions, and/or a permitted address range may occur. If it is determined that such change to sharing policy is to occur, control passes to block 560 where the first application may notify the second application regarding the change. In response to this notification, the second application may send an acknowledgment back to the first application, e.g., via the out-of-band mechanism. Thus as illustrated it is determined at diamond 565 whether an acknowledgment has been received.

When this acknowledgment is received such that the second application has been made aware of the impending change, control passes to block 570 where the first application may send a setup descriptor to the data mover. More specifically, the first application may send a PASID permissions table setup descriptor to request a change in permissions or address range for the second application. Once the data mover effects this change, e.g., by updating the appropriate entry of the PASID permissions table, it sends a completion back to the first application. And, as further illustrated in FIG. 5 when the first application receives this completion (as determined at diamond 580), it communicates an updated address range and/or permissions to the second application (block 590). As such, from this point going forward the second application may issue offload requests to the data mover only for addresses falling within the updated address range and/or updated permissions. Understand while shown at this high level in the embodiment of FIG. 5, many variations and alternatives are possible.

Figure 6:
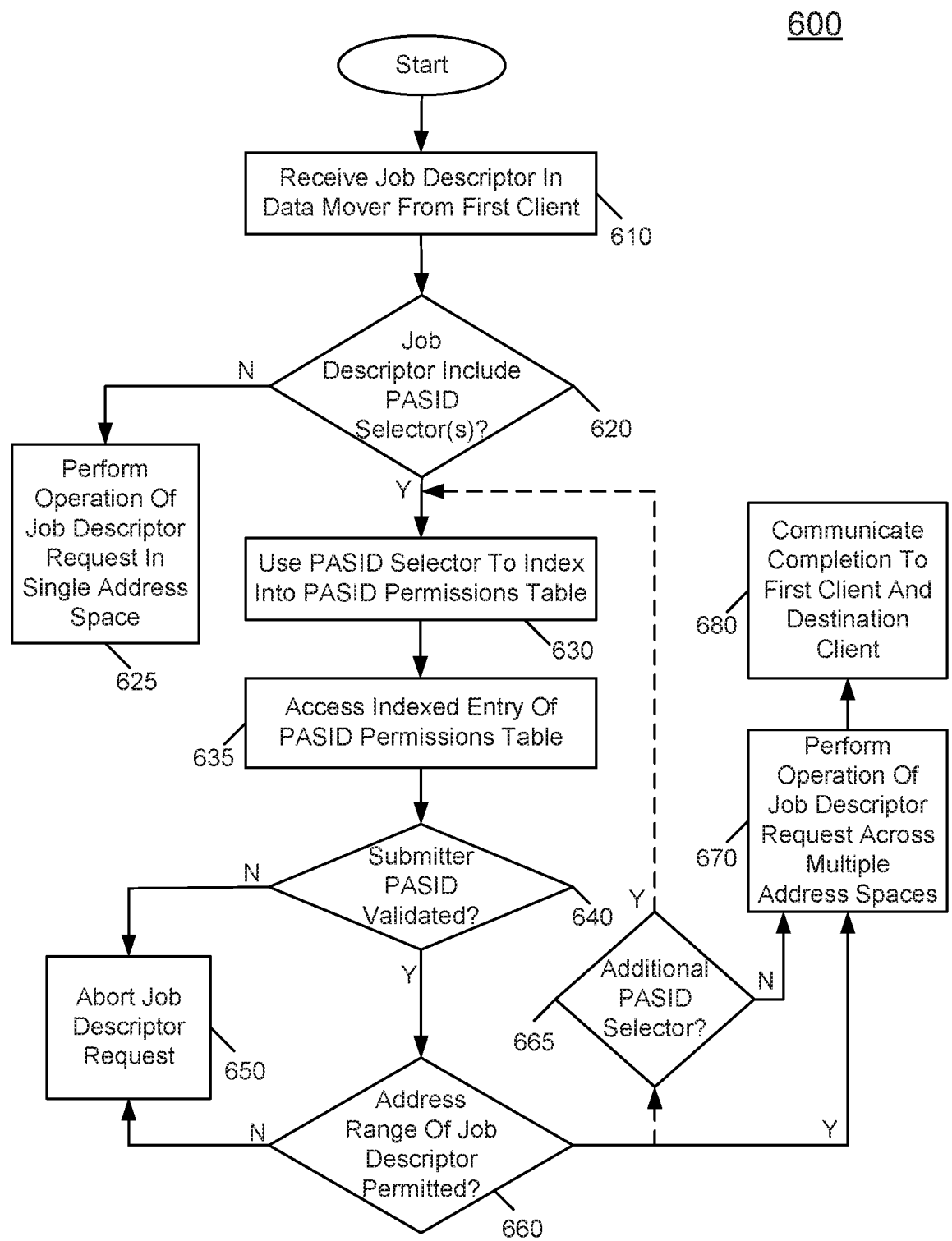
FIG. 6 is a flow diagram of a method in accordance with yet another embodiment.

Referring now to FIG. 6, shown is a flow diagram of a method in accordance with yet another embodiment. As shown in FIG. 6, method 600 is a method for performing a data operation by a data mover on behalf of a client. Accordingly, method 600 may be performed by hardware circuitry, firmware, software and/or combinations thereof.

As illustrated, method 600 begins by receiving a job descriptor in the data mover from a first client (block 610). Note that this client may be a software entity such as a privileged or non-privileged resource. In typical embodiments, this job descriptor may be received in the data mover by way of an offloading from a CPU or other processing circuit. Next, control passes to diamond 620 to determine whether the job descriptor includes one or more PASID selectors. If not, control passes to block 625 where the requested operation of the job descriptor may be performed in a single address space, namely the address space associated with this first client.

Otherwise when it is determined that the job descriptor includes at least one PASID selector, control passes to block 630. At block 630, this PASID selector may be used to index into the PASID permissions table. Thus based on this indexing, a given entry of the PASID permissions table may be accessed and information from this entry can be analyzed to determine whether the submitter PASID is validated (diamond 640). Namely, this determination may be based on verifying that the submitter PASID received in the job descriptor matches the submitter PASID stored in the indexed entry. If not, control passes to block 650 where this job descriptor request may be aborted.

Assuming that the submitter PASID is validated, control next passes to diamond 660 to determine whether the address range of the job descriptor is permitted. For example, the job descriptor may identify source and destination addresses and at diamond 660, it may be determined whether these addresses fall within an address range to which the first client is permitted access as per the permissions in the PPT entry. If not, control passes again to block 650 to abort the job descriptor request.

When it is determined that the job descriptor is thus validated (by way of validating submitter PASID, address ranges, and additional permissions (such as read/write permissions or so forth)), control next passes to block 670 where the operation of the job descriptor request may be performed. More specifically here, the operation may be performed securely across multiple address spaces, including possibly the address space of the first client, and one or more additional address spaces. To this end, optionally it may be determined whether there are additional PASID selectors in the job descriptor (diamond 665). If so, control passes back to block 630 for further analysis of an additional one or more entries within the PASID permissions table.

Finally, after the operation has been completed control passes to block 680. At block 680 a completion may be communicated to the first client and also to a destination client. To this end, the data mover may send a completion message to the first client, namely to a completion record address identified in the job descriptor. In addition, the data mover may send another completion message to the destination client, and more specifically to a destination notification record address identified in the job descriptor. Understand while shown at this high level in the embodiment of FIG. 6, many variations and alternatives are possible.

Figure 7:
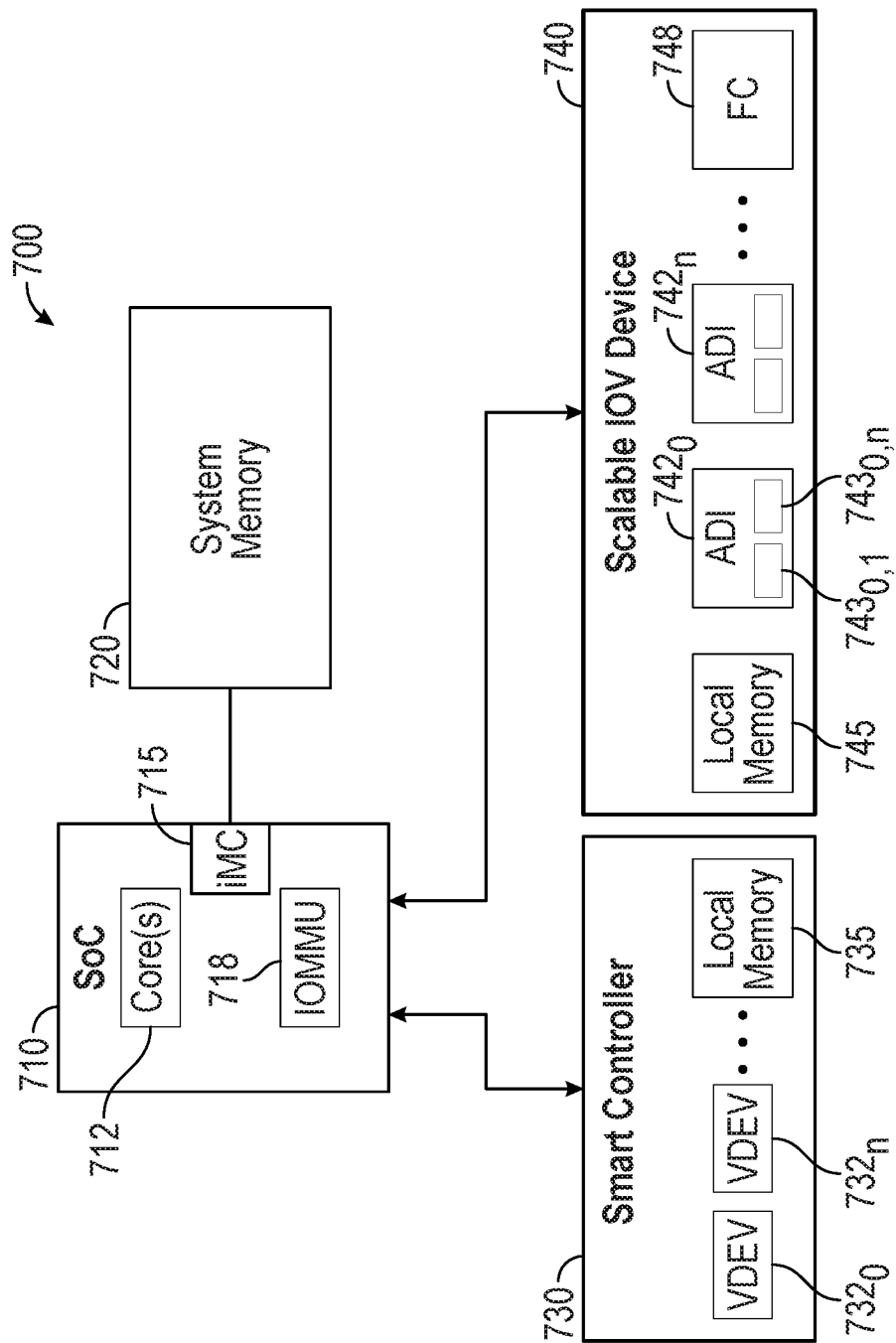
FIG. 7 is a block diagram of a computing system in accordance with an embodiment of the present invention.

Referring now FIG. 7, shown is a block diagram of a computing system in accordance with an embodiment of the present invention. As shown in FIG. 7, computing system 700 may be any type of computing device, ranging from a small portable device such as smartphone, tablet computer, to larger devices such as client systems and even larger devices such as server systems or so forth. In the high level view of FIG. 7, a system on chip (SoC) 710 couples to a system memory 720, which may be implemented as a dynamic random access memory (DRAM). In addition, SoC 710 further couples to a smart controller 730 and a scalable IOV device 740. As examples, smart controller 730 may be a smart NIC or other such device, while as one example scalable IOV device 740 may be implemented as a scalable storage device such as a non-volatile memory express (NVMe) device. Other examples of scalable IOV devices may include general purpose graphics processing unit (GPGPU) or other accelerators (crypto, compression, AI, etc.), or high speed network interface.

In the high level shown, SoC 700 includes one or more cores 712, integrated memory controller 715 to interface with system memory 720 and an IO memory management unit (IOMMU) 718. Of course many more components may be present within SoC 710. In a virtualization environment, understand that a plurality of virtual machines (not shown for ease of illustration in FIG. 7) may execute under a given virtual machine monitor or other supervisor software. Each of these entities may have independent address spaces mapped to portions of system memory 720.

As further shown, smart controller 730 includes virtual devices (VDEVs) $732_{0,n}$ and, optionally a local memory 735. In an embodiment, each VDEV 732 may be associated with a given virtual machine and may include one or more storages, such as registers to store associations for VMs and other information. To interface with scalable IOV device 740, smart controller 730 may communicate to the scalable IOV device 740 by accessing its registers (similar to driver software running on CPU cores). As shown, scalable IOV device 740 itself includes Assignable Device Interfaces (ADIs) $742_{0,n}$. With embodiments herein, each ADI 742 may be configured with multiple PASIDs, such as PASIDs $743_{0,1-0,n}$. To this end, each ADI 742 may be associated with a given virtual machine and may include one or more storages, such as registers to store these PASIDs. Scalable IOV device 740 may further include at least one functional circuit 748. In different examples, functional circuit 748 may implement a storage, an accelerator, or other device functionality that may be used by ADIs to perform the device's functions. And as shown, scalable IOV device 740 also may optionally include a local memory 745.

Note that system 700 may take the form of a wide variety of computing platforms. In one particular example, computing system 700 may be implemented using one or more servers such as implemented rack-mounted system of a cloud services provider. In such use cases, a cloud services provider may use smart controller 730 (e.g., a smart NIC) to virtualize I/O device 740 (e.g., NVMe, GPU) to the VM. All upstream memory requests from smart controller 730 and scalable IOV device 740 go through IOMMU 718, which translates the memory addresses from a guest physical address, e.g., of a corresponding VM, to a host physical address that is used to access the VM's data in system memory 720. This translated host physical address is then routed to destination memory through the platform's physical address-based routing circuitry.

In an embodiment, VDEV emulation is done using a Virtual Device Composition Module (VDCM) in the VMM or in a hardware component such as a smart controller. In some cases a smart NIC may be used to emulate VDEVs for the VMs. Typically, a VM's slow path I/O operations (such as control and configurations) are intercepted and emulated by the VDCM and fast path operations (e.g., work submissions) are submitted directly to IOV device 740.

Smart controller 730 may intercept the fast-path work submission operations (and slow-path operations) from the VMs to perform some value-added services on the VM's I/O requests. After processing the work requests from the VMs, the smart controller creates new work descriptors in its own address space. Smart controller 730 in turn may submit the new I/O work descriptors to a corresponding ADI 742 of scalable IOV device 740. Without an embodiment, if an ADI only supports a single PASID (i.e., can access only a single address space), undue overhead would be incurred. As an example, an ADI would have to access both work descriptors and data buffers from a single address space. This in turn would cause smart controller 730 to copy the data buffers from VM's address space to the smart controller's address space (since the new work descriptors are also created in the smart controller's address space) before submitting descriptors to the ADI, which would unduly impact performance overhead.

When a given ADI 742 of scalable IOV device 740 issues a direct memory access DMA request, it is tagged with a PASID. In turn, IOMMU 718 uses this PASID to identify the VM's address space and perform DMA remapping.

Instead with embodiments, scalable IOV device 740 may be optimized by enabling ADIs 742 to access multiple address spaces. For example, in one embodiment, ADIs 742 may access work descriptors from an address space of smart controller 730, in addition to directly accessing data stored in a VM's address space.

As such, embodiments avoid incurring smart controller copy operations to copy I/O data from VM memory into its own memory, which incurs a large performance overhead. And further overhead reductions may be realized by enabling an ADI of a scalable IOV device to access both descriptors and data buffers stored in multiple address spaces, via configuration of ADIs with multiple PASIDs.

In an embodiment, such multiple PASIDs per scalable IOV ADI may improve performance, especially for smart controller usages. As an example, ADI 742$_0$ can use one PASID (e.g., 743$_{0,0}$) to access work descriptors from one address space and another PASID (e.g., 743$_{0,n}$) to access data from another address space. With this arrangement, ADI 742$_0$ can access multiple address spaces, and the host OS/VMM/smart controller can avoid copying data around to ensure all data is in one address space, thus reducing I/O virtualization overhead.

In embodiments, scalable I/O devices support a work submission interface using a work queue in system memory. The work queue contains work descriptors, which describe the I/O operation to be performed. Note the terms "work descriptor" and "job descriptor" may be used interchangeably herein. Each I/O work descriptor may contain one or more addresses pointing to data. I/O requests may be submitted by enqueuing work descriptors in the work or descriptor queue and then informing the I/O device. In an embodiment this notification may be implemented using a doorbell mechanism (typically a MMIO register in the device). The device first reads the descriptor from the queue and processes it. As part of the processing, the device also reads/writes the addresses in the descriptor to access the data and perform the requested function.

Figure 8:
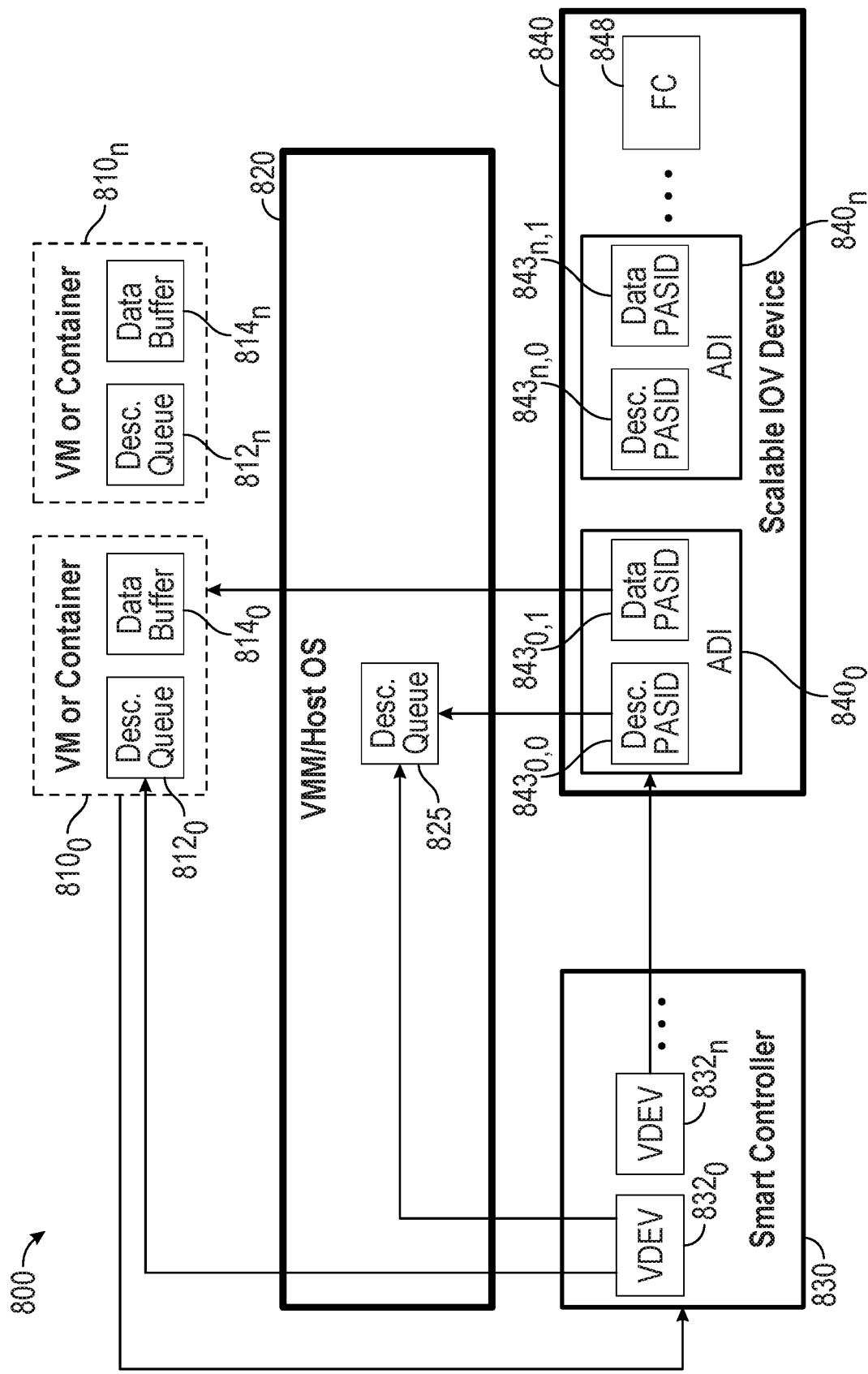
FIG. 8 is a block diagram of a system in accordance with another embodiment.

Referring now to FIG. 8, shown is a block diagram of a system in accordance with another embodiment. As shown in FIG. 8, system 800, which may be implemented similarly to system 700 of FIG. 7, shows interaction between software entities, including virtual machines or containers 810$_{0,n}$ and corresponding smart controller 830 and scalable IOV device 840. As further shown, interaction between these components and an underlying host software, e.g. a VMM/host OS 820, also is illustrated.

As shown, each VM 810 may include corresponding descriptor queues 812 and data buffers 814. Smart controller 830, via VDEVs 832$_{0,n}$, may generate one or more descriptor queues 825 stored in host memory 820 (in smart controller's address space). In turn, by way of multiple PASIDs 843 (namely 843$_{0,0\text{-}0,1;\ n,0\text{-}n,1}$), ADIs 842 may access multiple address spaces, including a corresponding descriptor queue 825 in host memory 820 and a data buffer 814 in corresponding VM memory 810. In this way, at least one functional circuit 848 within scalable IOV device 840 may be shared by ADIs 842 to process the work descriptors (or in other words, perform the device's functions).

In the embodiment of FIG. 8, an ADI 842 may be assigned to a given VM by emulating a VDEV 832 in smart controller 830. Note in another embodiment, the VDEV can be emulated in the VMM/Host OS using a VDCM.

A guest driver in VM 810$_0$ prepares descriptor queue 812$_0$, which contains I/O work descriptors. These I/O work descriptors are submitted to VDEV 832 using a device specific method (e.g., a doorbell). This triggers smart controller 830 to fetch the I/O descriptors from VM's descriptor queue 812$_0$. After processing the descriptors, smart controller 830 prepares new I/O descriptors in a descriptor queue 825 in host memory 820. Note in another embodiment, a smart controller may prepare new I/O descriptors in a descriptor queue in controller's local memory.

As shown in FIG. 8, ADI 843$_0$ is configured to point to descriptor queue 825 of smart controller 830 via a descriptor PASID 843$_{0,1}$, which is used to access descriptor queue 825 in host memory 820. In turn ADI 843$_0$ may access data buffer 814$_0$ in VM memory 810$_0$ using a data PASID 843$_{0,1}$.

After preparing the I/O descriptors in host descriptor queue 825, smart controller 830 submits them to ADIs 842 using a device specific method (e.g., doorbell). This triggers ADIs 842 to fetch the I/O work descriptor from host memory

820 using descriptor PASIDs 843. As part of processing the descriptors, ADIs 842 may access data stored in data buffers 814 of VM memory 810 using data PASIDs 843. This allows the VMM/smart controller to avoid copying the data buffers from VM memory to host memory beforehand, improving I/O virtualization performance.

In an embodiment in which a smart controller creates a descriptor queue is its own local memory, descriptor fetch from the ADI is routed to the local memory. To this end, a VMM may enable peer-to-peer DMA from scalable IOV device to smart controller. On ADI's descriptor fetch, an IOMMU performs an address translation to obtain a physical address of the smart controller's local descriptor queue. The platform's physical address-based routing ensures that the descriptor queue access is redirected to the smart controller's memory for a peer-to-peer DMA.

In another embodiment, an ADI may support additional PASIDs (i.e., more than 2 PASIDs) to access other device-specific data from additional address spaces. For example, a scalable IOV device may store message signaled interrupt (MSI) interrupt messages (i.e., MSI address and data) in a table (e.g., an interrupt table) in host memory. The interrupt table may be created in a separate address space than descriptor queues and data buffers. Consequently, the ADIs may use a third PASID to fetch the MSI message from the interrupt table for generating an interrupt to notify (e.g., requester and/or target) as to completion of descriptors.

Figure 9:
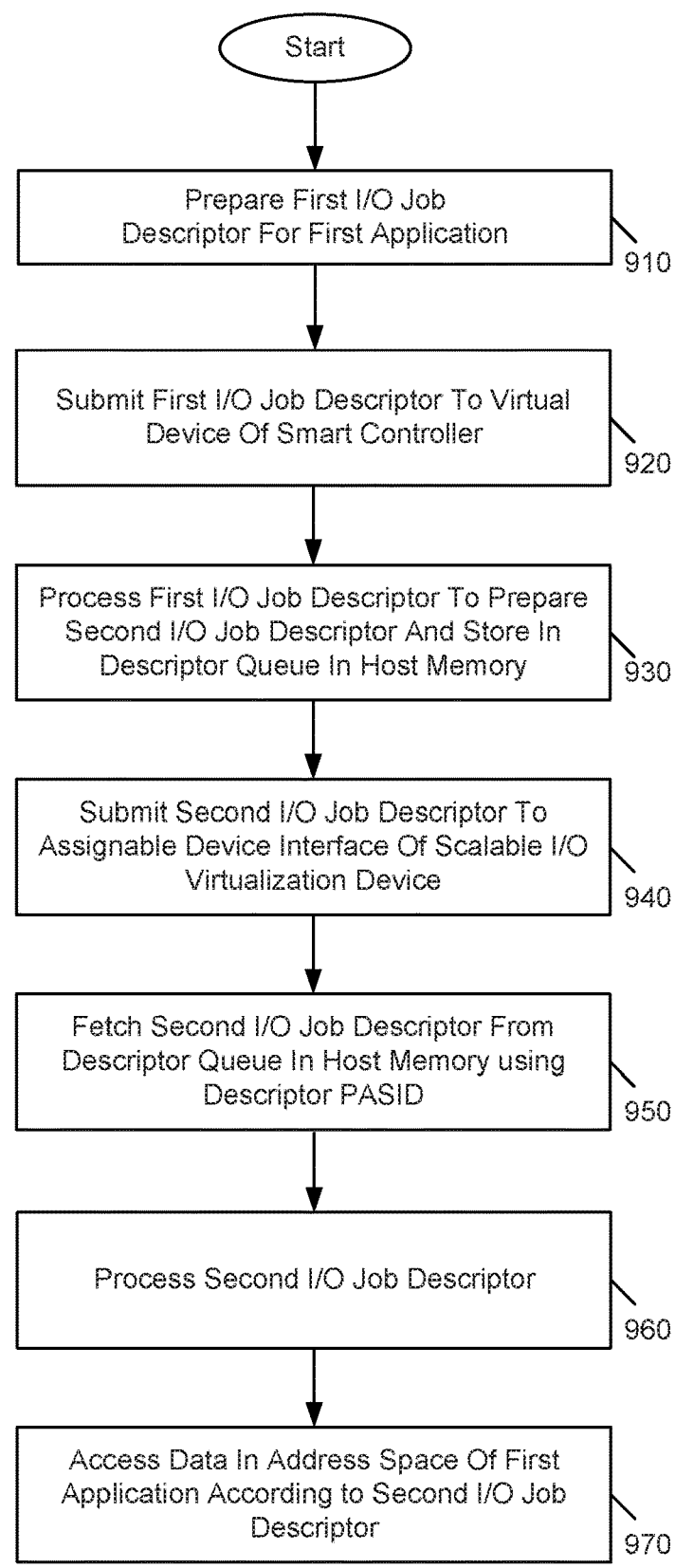
FIG. 9 is a flow diagram of a method in accordance with yet another embodiment of the present invention.

Referring now to FIG. 9, shown is a flow diagram of a method in accordance with yet another embodiment of the present invention. More specifically, method 900 is a method for accessing multiple address spaces by a scalable IOV device in accordance with an embodiment. Accordingly, method 900 may be performed by hardware circuitry, firmware, software and/or combinations thereof.

As illustrated, method 900 begins by preparing a first I/O job descriptor for a first application (block 910). In one embodiment, a guest driver, e.g., of a given VM may prepare this job descriptor. Next at block 920 this first I/O job descriptor may be submitted to a virtual device emulated by a smart controller. In an embodiment, a device specific method such as a doorbell mechanism may be used to communicate this I/O job descriptor.

Still with reference to FIG. 9, next at block 930 the smart controller may process this first I/O job descriptor to prepare a second I/O job descriptor and store it in a descriptor queue in host memory. Note that this descriptor queue may be associated with a corresponding ADI, namely an ADI associated with the first application. Then, the smart controller may submit this job to the scalable I/O virtualization device (block 940). More particularly, this second I/O job descriptor may be submitted to an ADI of the scalable I/O virtualization device. In response to this submission, at block 950 the ADI may obtain the job descriptor from the descriptor queue in host memory. To this end, the ADI may use a descriptor PASID to obtain the second I/O job descriptor. Then at block 960 the ADI may process this second I/O job descriptor to determine the requested operation, permissions and other information. Then at block 970 in response to this second I/O job descriptor, data within an address space of the first application may be accessed. More specifically, the ADI may use a data PASID that points to an address space, e.g., of a VM including a data buffer that includes the data to be accessed. Understand while shown at this high level in the embodiment of FIG. 9, many variations and alternatives are possible.

The following examples pertain to further embodiments.

In one example, an apparatus comprises: a data mover accelerator comprising: a control circuit; and an execution circuit coupled to the control circuit, where the execution circuit, based on a first job descriptor from a first agent having a first address space and a first PASID to identify the first address space, is to securely access the first address space and a second address space, the first job descriptor comprising a second PASID selector to specify a second PASID to identify the second address space.

In an example, the apparatus further comprises a permissions table coupled to the data mover accelerator, where the permissions table comprises a plurality of entries.

In an example, the permissions table is located on the device (in SRAM or on-device memory). In another example the permissions table is located in system memory and is pointed to by device MMIO registers (base PPT address and size). If implemented in memory, the data mover accelerator may cache frequently accessed PPT entries onto the device. In different examples, the permissions table is implemented as single level table or a multi-level table.

In an example, the first job descriptor further comprises a third PASID selector to specify a third PASID to identify a third address space, where in response to the first job descriptor, the data mover accelerator is further to securely access the third address space.

In an example, the second PASID selector comprises a destination PASID selector, and where the data mover accelerator, in response to the first job descriptor, is to move data to the second address space.

In an example, the third PASID selector comprises a source PASID selector, and where the data mover accelerator, in response to the first job descriptor, is to move the data from the third address space to the second address space.

In an example, the data mover accelerator is to send a completion to a first address of the first address space after the data is written to the second address space, according to a completion record address of the first job descriptor.

In an example, the data mover accelerator is to send a notification to a destination address of the second address space after the data is moved to the second address space, according to a destination notification address of the first job descriptor.

In an example, the apparatus further comprises a central processing unit coupled to the data mover accelerator, where the central processing unit is to offload the first job descriptor to the data mover accelerator.

In another example, a method comprises: receiving, in an offload engine, a first job descriptor from a first client, the first job descriptor comprising a first PASID associated with a first address space of the first client and a second PASID selector associated with an address space of a second client; accessing a permissions table using the second PASID selector to determine whether the first client is permitted to access the second address space; and in response to determining that the first client is permitted to access the second address space, performing, by the offload engine, a memory operation requested in the first job descriptor within the second address space, and thereafter writing a completion notification to the first address space.

In an example, where the first job descriptor further comprises a third PASID selector associated with a third address space of a third client, the method further comprises: accessing the permissions table using the third PASID selector to determine whether the first client is permitted to access the third address space; and in response to determining that the first client is permitted to access the third address space, further performing, by the offload engine, the memory operation within the third address space.

In an example, the method further comprises in response to determining that the first client is not permitted to access the second address space, aborting the memory operation.

In an example, the method further comprises receiving the first job descriptor from a virtual machine monitor comprising the first client and performing the memory operation within the second address space comprising a data move operation, where the second client comprises a virtual machine.

In an example, the method further comprises: determining whether an address of the first job descriptor is within an address range of the second address space to which the first client is permitted access; and in response to determining that the address of the first job descriptor is within the address range of the second address space to which the first client is permitted access, performing the memory operation at the address within the second address space.

In an example, the method further comprises: receiving a permissions table entry setup job descriptor from the second client, the permissions table entry setup job descriptor comprising one or more updated permissions and a fourth PASID selector; accessing the permissions table using the fourth PASID selector to determine whether the second client is permitted to update an entry of the permissions table; and updating the entry of the permissions table in response to the permissions table entry setup job descriptor, where the second client comprises an unprivileged client.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, an apparatus comprises: an execution circuit to execute a data access operation comprising secure access to first data stored in a first address space associated with a first agent and secure access to a second address space associated with a second agent; and a control circuit coupled to the execution circuit, where the control circuit is to receive a first job descriptor from the second agent, the first job descriptor comprising a first PASID selector to specify a first PASID for the first address space and a submitter PASID to identify a second PASID for the second address space and, in response to the first job descriptor, to cause the execution circuit to execute the data access operation.

In an example, the apparatus comprises a data mover accelerator.

In an example, the data mover accelerator further comprises a permissions table coupled to the control circuit.

In an example, the permissions table comprises a plurality of entries each to store a submitter PASID, one or more permissions of an agent associated with the submitter PASID, and an access PASID corresponding to an address space associated with another agent.

In an example, a first entry of the plurality of entries comprises an address range field to indicate an address range of the address space owned by the another agent for which the one or more permissions is provided.

In an example, the control circuit is to receive a permissions table entry setup job descriptor from the another agent and in response to the permissions table entry setup job descriptor, to update the first entry to modify the one or more permissions and/or an accessible address range for the agent associated with the submitter PASID.

In an example, upon receipt of a job descriptor containing the second PASID selector, the control circuit is to use the entry of the permissions table associated with the second PASID selector.

In an example, the control circuit is to validate the submitter PASID contained in the job descriptor against the submitter PASID in the first entry and upon successful validation, access the second address space using the access PASID in the entry of the permissions table.

In an example, the control circuit is to receive a permissions table entry setup job descriptor from the another agent and in response to the permissions table entry setup job descriptor, to update the first entry to modify the one or more permissions and/or accessible address range for the agent associated with the submitter PASID.

In an example, the control circuit is to update the first entry associated with the first PASID selector in the permissions table entry setup job descriptor.

In an example, the control circuit is to validate the submitter PASID contained in the permissions table entry setup job descriptor against the access PASID in the first entry and upon successful validation, update the first entry.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EE- PROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a data mover accelerator comprising an offload device to perform operations on at least one memory, the operations offloaded from a processor, the data mover accelerator comprising:
 a control circuit; and
 an execution circuit coupled to the control circuit, wherein the execution circuit is to securely access a first address space of a first agent and a second address space of a second agent, based on a first job descriptor submitted from the first agent having a first process address space identifier (PASID) that is a submitter PASID to identify the first agent as the submitter of the first job descriptor and to identify the first address space, the first job descriptor comprising a second PASID selector to specify a second PASID that is an access PASID to identify the second address space; and
memory coupled to the control circuit, the memory to store a permissions table comprising a plurality of entries to store submitter PASIDs, one or more permissions of agents associated with the submitter PASIDs, and access PASIDs corresponding to address spaces associated with other agents.

2. The apparatus of claim 1, further comprising first memory a coupled to the data mover accelerator, the first memory to store a permissions table comprising a plurality of entries.

3. The apparatus of claim 2, wherein the first job descriptor further comprises a third PASID selector to specify a third PASID that is a second access PASID to identify a third address space of a third agent, wherein in response to the first job descriptor, the data mover accelerator is further to securely access the third address space.

4. The apparatus of claim 3, wherein the second PASID selector comprises a destination PASID selector, and wherein the data mover accelerator, in response to the first job descriptor, is to move data to the second address space.

5. The apparatus of claim 4, wherein the third PASID selector comprises a source PASID selector, and wherein the data mover accelerator, in response to the first job descriptor, is to move the data from the third address space to the second address space.

6. The apparatus of claim 4, wherein the data mover accelerator is to send a completion to a first address of the first address space after the data is written to the second address space, according to a completion record address of the first job descriptor.

7. The apparatus of claim 4, wherein the data mover accelerator is to send a notification to a destination address of the second address space after the data is moved to the second address space, according to a destination notification address of the first job descriptor.

8. The apparatus of claim 1, wherein the processor comprises a central processing unit coupled to the data mover accelerator, wherein the central processing unit is to offload the first job descriptor to the data mover accelerator.

9. At least one non-transitory computer readable storage medium having stored thereon instructions, which if performed by a machine cause the machine to perform a method comprising:
receiving, in an offload engine coupled to a processor, a first job descriptor for a job request comprising a packet switching task submitted by a virtual machine monitor comprising a first client, the first job descriptor comprising a first process address space identifier (PASID) associated with a first address space of the first client and a second PASID selector associated with an address space of a second client;
accessing, via the offload engine, a permissions table using the second PASID selector to determine whether the first client is permitted to access the second address space; and
in response to determining that the first client is permitted to access the second address space, performing, by the offload engine, a memory operation within the second address space, thereby causing execution of the job request requested in the first job descriptor, and thereafter writing a completion notification to the first address space, wherein after the memory operation of the packet switching task is completed, the second client is to access data of the memory operation within the second address space.

10. The at least one non-transitory computer readable storage medium of claim 9, wherein the first job descriptor further comprises a third PASID selector associated with a third address space of a third client, the method further comprising:
accessing the permissions table using the third PASID selector to determine whether the first client is permitted to access the third address space; and
in response to determining that the first client is permitted to access the third address space, further performing, by the offload engine, the memory operation within the third address space.

11. The at least one non-transitory computer readable storage medium of claim 9, wherein the method further comprises in response to determining that the first client is not permitted to access the second address space, aborting the memory operation.

12. The at least one non-transitory computer readable storage medium of claim 9, wherein the method further comprises receiving the first job descriptor from the virtual machine monitor comprising the first client and performing the memory operation within the second address space comprising a data move operation, wherein the second client comprises a virtual machine.

13. The at least one non-transitory computer readable storage medium of claim 9, wherein the method further comprises:
determining whether an address of the first job descriptor is within an address range of the second address space to which the first client is permitted access; and
in response to determining that the address of the first job descriptor is within the address range of the second address space to which the first client is permitted access, performing the memory operation at the address within the second address space.

14. The at least one non-transitory computer readable storage medium of claim 9, wherein the method further comprises:
receiving a permissions table entry setup job descriptor from the second client, the permissions table entry setup job descriptor comprising one or more updated permissions and a fourth PASID selector;

accessing the permissions table using the fourth PASID selector to determine whether the second client is permitted to update an entry of the permissions table; and updating the entry of the permissions table in response to the permissions table entry setup job descriptor, wherein the second client comprises an unprivileged client.

15. The at least one non-transitory computer readable storage medium of claim 9, wherein the method further comprises receiving the first job descriptor comprising the packet switching task submitted by a virtual switch of the virtual machine monitor.

16. An apparatus comprising:

a data mover accelerator comprising:

an execution circuit to execute a data access operation comprising secure access to first data stored in a first address space associated with a first agent and secure access to a second address space associated with a second agent;

a control circuit coupled to the execution circuit, wherein the control circuit is to receive a first job descriptor from the second agent and cause the execution circuit to execute the data access operation in response to the first job descriptor, the first job descriptor comprising a first process address space identifier (PASID) selector to specify a first PASID for the first address space and a submitter PASID to identify a second PASID for the second address space; and memory coupled to the control circuit, the memory to store a permissions table comprising a plurality of entries to store submitter PASIDs, one or more permissions of aaents associated with the submitter PASIDs, and access PASIDs corresponding to address spaces associated with other agents.

17. The apparatus of claim 16, wherein a first entry of the plurality of entries comprises an address range field to indicate an address range of the first address space owned by the first agent for which the one or more permissions is provided.

18. The apparatus of claim 16, wherein the control circuit is to receive a permissions table entry setup job descriptor from the second agent and in response to the permissions table entry setup job descriptor, to update the first entry to modify the one or more permissions and/or an accessible address range for the second agent.

* * * * *